United States Patent [19]

Jeffrey

[11] E Re. 30,440

[45] Reissued Dec. 2, 1980

[54] SYNCHRONOUS BELT AND PULLEY DRIVE

[75] Inventor: Joseph O. Jeffrey, Ithaca, N.Y.

[73] Assignee: Borg-Warner Corporation, Chicago, Ill.

[21] Appl. No.: 911,019

[22] Filed: May 30, 1978

Related U.S. Patent Documents

Reissue of:

[64] Patent No.: 4,047,444
Issued: Sep. 13, 1977
Appl. No.: 722,237
Filed: Sep. 10, 1976

[51] Int. Cl.[3] ..... F16H 7/00

[52] U.S. Cl. ..... 74/229; 74/231 C

[58] Field of Search ..... 74/229, 231 C, 231 R, 74/216.5, 214

[56] References Cited

U.S. PATENT DOCUMENTS

| | | | |
|---|---|---|---|
| 3,083,582 | 4/1963 | Wheeler | 74/229 |
| 3,194,609 | 7/1965 | Thurlow | 305/57 |
| 3,313,166 | 4/1967 | Elster | 74/229 |
| 3,377,875 | 4/1968 | Sand | 74/229 |
| 3,597,985 | 8/1971 | Jeffrey | 74/229 |
| 3,738,187 | 6/1973 | Hisserich | 74/231 C |
| 3,853,016 | 12/1974 | Lane | 74/231 C |

FOREIGN PATENT DOCUMENTS

| | | | |
|---|---|---|---|
| 1124318 | 2/1962 | Fed. Rep. of Germany | 74/231 C |
| 1650653 | 3/1971 | Fed. Rep. of Germany | 74/229 |
| 4759 | of 1897 | United Kingdom | 74/231 R |
| 951340 | 3/1964 | United Kingdom | 74/231 R |
| 1064332 | 4/1967 | United Kingdom | 74/231 C |

*Primary Examiner*—Samuel Scott
*Assistant Examiner*—G. Anderson
*Attorney, Agent, or Firm*—Aubrey L. Burgess

[57] ABSTRACT

A synchronous belt and pulley drive in which the drive between spaced pulleys is primarily by frictional contact of a belt on the pulley peripheries; synchronization is insured by providing spaced teeth on the belt which teeth are accommodated by tooth gaps in the periphery of the pulleys. The drive is further characterized by matching the pitch of the driveR pulley with the belt pitch under a first tension and matching the pitch of the driveN pulley with the belt pitch under a second tension, wherein the first tension is different and usually greater than the second tension.

2 Claims, 4 Drawing Figures

SYNCHRONOUS BELT AND PULLEY DRIVE

Matter enclosed in heavy brackets [ ] appears in the original patent but forms no part of this reissue specification; matter printed in italics indicates the additions made by reissue.

BACKGROUND OF THE INVENTION

Current design practice for designing synchronous belt drives follows the same general principles used for designing inverted tooth chain drives wherein the chain (or belt, as the case may be) teeth carry the load imposed on the drive. However, a belt differs from a chain in at least two important respects, i.e., belts, because of their construction of elastomeric material, usually with a reinforcing cord and/or cloth covering, elongate much more than chains under load; and the resilient belt teeth deflect much more than the relatively rigid teeth of a chain. In a belt drive, friction between the belt and the pulley peripheries can be utilized to carry a major portion of the load.

The Invention

This invention relates to synchronous belt drives as, for example, those in automotive timing arrangements. Other uses will be apparent to those skilled in the art.

One of the primary purposes of this invention is, in a drive using a toothed belt and toothed pulleys, to take advantage of belt-pulley friction as the primary load-carrying means. The principal function of the teeth is to eliminate excessive slip and insure and maintain synchronization between the pulleys. By doing so, belt tooth deflection and wear are minimized. This, in effect, transforms the toothed pulleys into pulleys having a "variable" pitch. The teeth on the "tight" strand of belt (from the driveN to the driveR pulley) cannot interfere with the pulley teeth because the pulley tooth gaps are larger in depth and length than the teeth of the belt, thus minimizing belt tooth deformation and wear. Therefore, because of the relatively small loads on the belt teeth, they can be spaced further apart, (the belt pitch extended) than in the normal, prior art toothed belt-sprocket drive. For example, a belt according to this invention may have approximately one-third (or less) the number of teeth than a conventional toothed belt, both of which are usable for the same purpose. Because of the fewer teeth on the belts, fewer teeth or tooth gaps are necessary on the pulleys. The fewer gaps generally mean lower manufacturing costs. By reducing the number of tooth gaps in the pulleys without increasing the size of the gaps, the area of contact between the outer periphery of the pulleys and the belt is increased, as compared to prior art drives. Thus, the friction effect between the belt and the pulleys is enhanced.

One of the important aspects of the invention is that the pitch of the driveR pulley substantially matches the belt pitch under a first tension and the pitch of the driveN pulley substantially matches the belt pitch under a second tension. The second tension is less than the first tension and equals the "slack" side tension of the belt while the first tension equals the tight or "taut" side tension of the belt. This relationship will be more fully discussed in the detailed description of the invention.

THE DRAWINGS

FIG. 1 of the drawings illustrates a side elevational view of a drive constructed to this invention;

DETAILED DESCRIPTION

Figure 1:
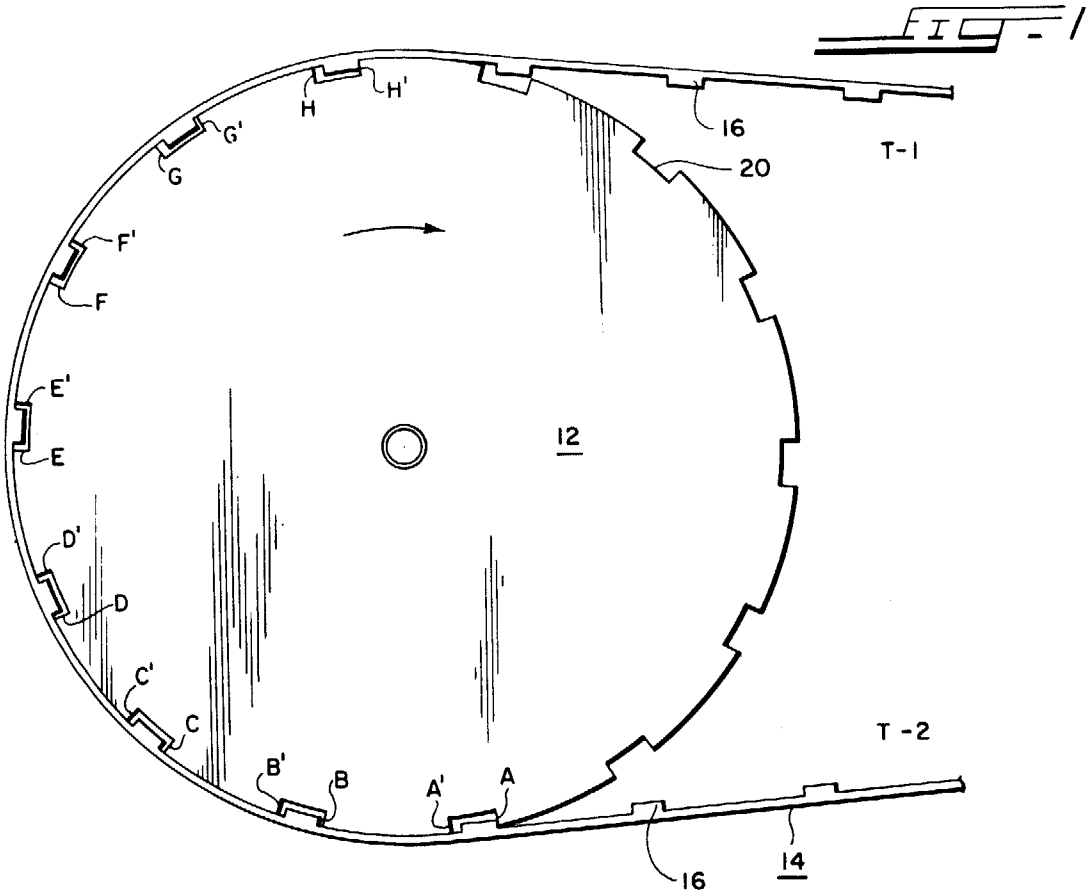

Looking at the drawings and especially FIG. 1, there is shown a belt drive comprising a driveR pulley 10 and a driveN pulley 12, each rotatable about its center and in the direction indicated by the arrows. The pulleys 10 and 12 are connected by a flexible belt 14 having a plurality of spaced teeth 16. The pulleys 10 and 12 are each constructed with tooth gaps 18 and 20, respectively, each of which will accommodate a belt tooth at the proper time. Each tooth gap 18 and 20 has a depth and length greater than the depth and length of a belt tooth 16.

When the pulleys are rotating, the belt is subjected to a first tention ($T_1$) at the tight or taut side, i.e., from the driveN pulley 12 to the driveR pulley 10, and to a tension ($T_2$) at the slack side, i.e., from the driveR pulley 10 to the driveN pulley 12. The pitch of the driveR pulley 10 approximately matches the pitch of the belt under tension $T_1$, while the pitch of the driveN pulley 12 approximately matches the pitch of the belt under tension $T_2$, which means that the pitch of the driveR pulley 10 differs from the pitch of the driveN pulley 12.

To design a belt drive based on the principles of this invention, the pitches of the pulleys are determined by the pitch of the belt strand entering the pulley. It is therefore necessary to know the elastic elongation—load characteristics of the belt. A reasonable size for the pitch diameter of the smallest pulley is selected, and the number of tooth gaps is chosen such that only two or three are provided to accommodate the belt teeth; the lengths of the tooth gaps being one half to one quarter of the spacing therebetween.

The total number of equally spaced tooth gaps (pitches) around the periphery of the smallest pulley is (illustrated for example, in FIG. 1 as the driveR pulley) such that only two or three pulley tooth gaps accommodate the teeth in the portion of the belt wrapping the pulley. Pulleys having five to eight tooth gaps are feasible, depending on the wrap. The number of pitches (tooth gaps) in the other pulleys is governed by the speed ratios required.

Having selected a reasonable pitch diameter (d) for the smallest pulley and the number of tooth gaps thereon (n), an approximate pitch (p) for the drive (pulleys and belt) can now be determined by dividing the chosen number of tooth gaps into the selected pulley and pitch circumference, i.e.

$$p = \pi d/n.$$

When only two pulleys (besides an idler if necessary or desirable) are involved, the number of pitches in the belt can be determined by reference to Center Distance Factor Tables, e.g. Catalog 189 (1969) published by Uniroyal, Inc. In as much as such tables list center distances in terms of pitches, it is necessary to convert the given center distance (in inches) into pitches by dividing it by the approximate pitch (p). The number of pitches in the belt is chosen to make the required center distance (in pitches, determined above) match as closely as possible a listed center distance value in the tables. Dividing the latter value (in pitches) into the given center distance (in inches) obtains a more exact value for belt pitch, hereinafter referred to as "assumed" belt pitch.

Since the pitch of the pulleys should match the pitch of the belt strands entering them, the pulley pitches are equal to the belt pitch plus the elastic pitch elongation of the entering belt strand due to the load on it. The pulley pitches will therefore differ from each other and from the "assumed" belt pitch. The linear length of belt required can be figured and compared with the actual belt length based on the number of pitches and the assumed belt pitch. If the actual belt length exceeds the calculated wrapped belt length, the calculations is repeated using a smaller assumed belt pitch (and vice-versa). Usually, not more than three trial calculations are necessary to obtain a correct solution.

FIG. 1 illustrates the relationship of the belt teeth and pulley teeth. For example, all the tooth gaps 18 or 20 have the same length; the length of the belt teeth 16 are approximately three-fourths of the length of the tooth gaps. The designations A to H represent the entry wall of the tooth gaps 20, from belt entry to belt exit, on the driveN pulley 12, and A' to H' represent the exit wall of the tooth gaps 20 from the belt entry to belt exit also on the driveN pulley 12.

There is no clearance at A and H'; if the belt tooth length is approximately three-fourths of the tooth gaps length, then $A'=H=$approx. $\frac{1}{4}$ tooth gaps length; and $A<B<C<D<E<F<G<H=\frac{1}{2}$ tooth gap length, and $$A'>B'>C'>D'>E'>F'>G'>H'=0$$

It is apparent that a similar relationship exists with respect to the tooth gaps 18 of the driveR pulley 10 and the length of belt teeth 16.

FIG. 1 of the drawing illustrates a belt-pulley drive constructed according to this invention wherein the pulley pitches correspond with the pitch of the belt strand entering it. The belt is wrapped around the pulleys; the tooth gaps in the pulleys are larger than the belt teeth, so that the belt can be mounted on the pulleys without interference. If an idler is used to apply an installed tension (as in FIG. 3), as is generally the case when the drive is used for automotive applications, the installed tension will move the belt slightly in a clockwise direction (as viewed in the drawing) on the driveR pulley, and contra-clockwise (as [viewd] *viewed* in the drawing) on the driveN pulley, but not sufficient to make the belt pitch match that of the pulleys. When the drive is running under full load, the slack strand (from driveR pulley to driveN pulley) relaxes as the taut strand (from driveN pulley to driveR pulley) stretches, so that the average pitch of the belt (i.e., engaging the pulleys) remains approximately unchanged. Since the belt tooth which is in working contact with a pulley tooth-gap wall is farthest away from the engagement point of the belt with the pulleys, the tooth load thereon is minimal, and, if necessary, deflection of this tooth will transfer load to the next adjacent belt tooth. This occurs only under abnormal load conditions, if at all.

The drive of this invention is not limited to any particular tooth form, nor is the invention limited to "extended" pitch belts (widely spaced teeth); it can be used with standard belts. However, it will be obvious that extended pitch belts and their corresponding pulleys will result in a drive which is less costly to manufacture when compared to belts and pulleys having closely adjacent teeth and tooth gaps. Also, the frictional drive characteristics are enhanced with the extended pitch.

The application of the design principles of the disclosure to an automotive timing drive are illustrated by the following calculations for these given conditions:

1. Center distance between pulleys 13.159 inches.
2. Installed belt tension, 45 lbs./strand. [This is also the tension at which the belt length is to be measured; heating the engine to 180° F. increases the crank shaft-cam shaft center distance enough to increase the belt tension by 25 lbs. per strand].
3. Belt 0.375 inches pitch × 0.600 inches wide.
4. Net working load on the belt, 16 lbs.
5. Conventional design resulted in the following specifications:
   Belt: 0.3758 inches pitch × 0.600 inches × 99 pitches long.
   Pulleys: 19 and 38 teeth, pitch 0.3758 inches.
   [Note that the belt not only has a unique number of teeth but also a special pitch, and there is nothing "standard" about any of the drive components. The life of such a belt may be marginal, as the tooth wear probably will be excessive].

Figure 2:
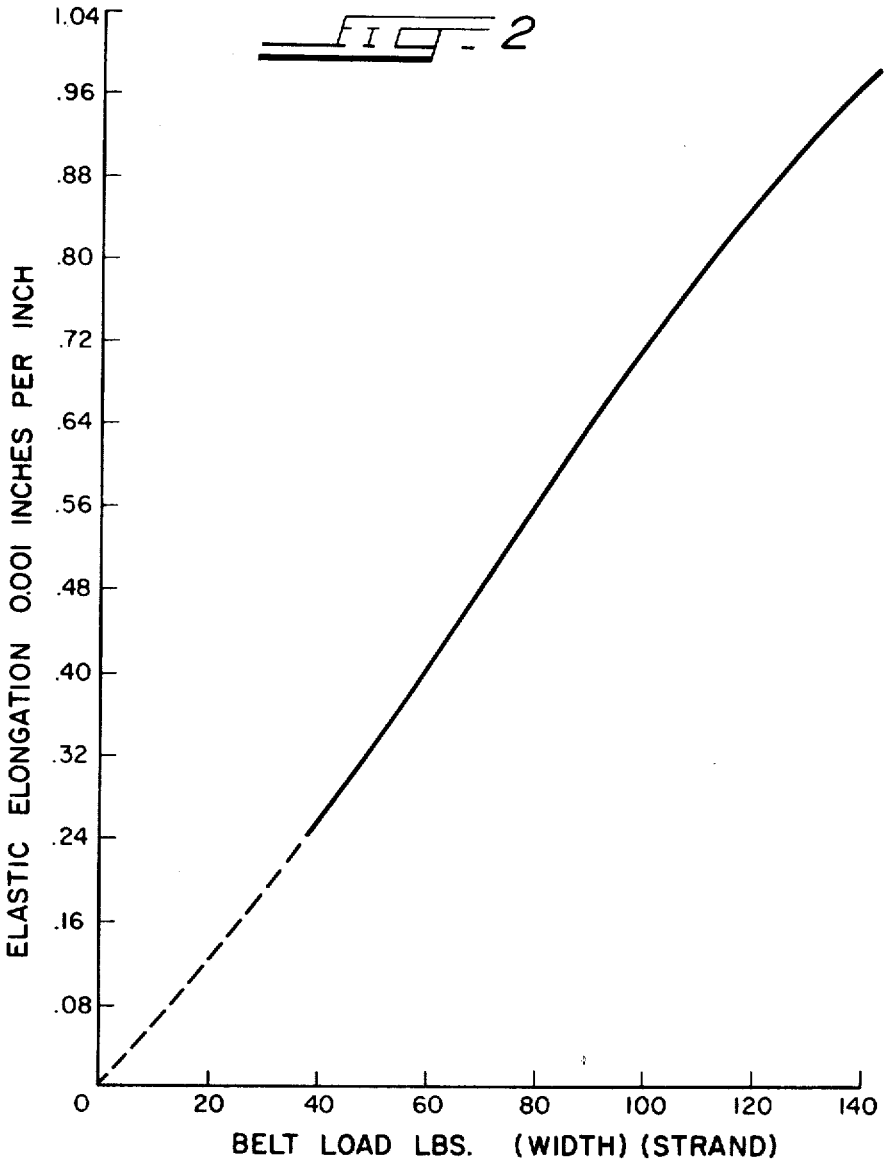
FIG. 2 is a graph in which elastic elongation is plotted against belt load.

Employing the principles disclosed in this invention, the design procedure is as follows:

[In addition to the center distance between pulleys, the installed belt tension, the belt pitch and width given above, it is necessary to know the elastic elongation—load curve, shown in FIG. 2.]

a. The belt width is accepted as 0.600 inches and for convenience, all loads are reduced to pounds per inch of width per strand:
   Installed tension and measuring load = 45/0.600 = 75 lbs. per inch per strand
   Tension when engine is heated to 180° F. = (45+25) 0.600 = 116.5 lbs. per inch per strand.
   Working load = 16/0.600 = 27 lbs. per inch per strand.
   Taut strand tension = 116.5 + 27/2 = 130 lbs./(inch)(strand).
   Slack strand tension = 116.5 − 27/2 = 103 lbs./(inch)(strand).
b. A reasonable size for the pitch diameter of the small pulley is selected, e.g. 2.25 inch = d.
c. An arbitrary number of teeth, is chosen e.g. 7 or 8 = n.
d. Since the speed ratio selected is 2:1, the large pulley must have 14 or 16 teeth = N.
e. The approximate pitch is then determined $p=\pi d/n=2.25\pi/7=1.010$ inches $2.25\pi/8=0.884$ inches
f. The center distance in pitches is calculated CD = 13.16/1.010 = 13.03 pitches
   13.16/0.884 = 14.90 pitches
g. Refer to standard Center Distance (CD) Tables (Uniroyal et al) to obtain belt length, $N_b$ in pitches,
   1. For $N-n=7$, $N_b-N=23$, then CD = 13.203 pitches.
   2. For $N-n=8$, $N_b-N=26$, then CD = 14,946 pitches.
   [Both of the above are very close to the required center distances as calculated in (f). Either might be selected, but it is sufficient for illustrative purposes to use only one, for example, CD=13.203 pitches].

h. A more exact pitch is calculated. [This may not be the finally selected pitch because it assumes the belt and pulley pitches to be alike, hence further adjustment will be required in order to match the pulley pitches with that of the entering belt. N=14, n=7, $N_b$=37, p=13.159/13.203=0.9967 inches].

i. The corresponding pulley pitch diameter is d=(7)(0.9967)/$\pi$=2.221 inches.

j. Inasmuch as the belt is to be mounted over the pulleys with the idler retracted and without exerting any appreciable force on the belt, the belt load will be zero. Note that the use of "installed" has been avoided here, as the installed tension signifies the belt load to which the idler, if used, must be adjusted after wrapping the unloaded belt over the pulleys. Since the driveR pulley pitch should match that of the taut strand of the belt (130 pounds per inch per strand) reference to the elastic elongation—load curve shows a length increase of 0.00093 inches/inch from the no load condition making the pitch of the driveR equal to the belt pitch plus 0.00093 inches per inch. Similarly, the slack strand of the belt entering the driveN pulley under a tension of 103 pounds per inch per strand elongates 0.00076 inch per inch; hence, the pitch of the driveN pulley should exceed that of the belt by 0.00076 inches per inch. To determine the pitch and length of belt required to satisfy the mismatched condition, it is necessary to use a trial and error method, and higher precision is demanded than that afforded by the slide rule which was adequate up to this point.

k. Start with a value of p somewhat larger than that found in (h) above, say $p_b$=1.000 inches where $p_b$ denotes the belt pitch. Then $p_r$=1.000+0.00093=1.00093, where $p_r$ is the pitch of the driving pulley having radius r; and $P_R$=1,000+0.00076=1.00076 inches, $P_R$ defining the pitch of the driveN pulley of radius R.

Calculate the radius of each pulley:

r=(1.00093)(7)/2$\pi$=1.115121 inches

R=(1.00076)(14)/2$\pi$=(2.229863/1.114742)=R−r

Figure 4:
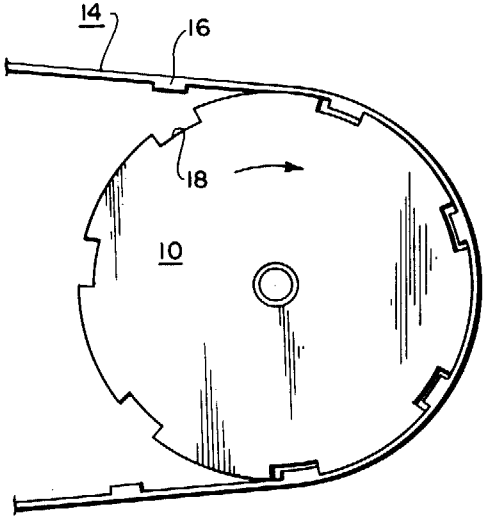
FIG. 4 is a schematic illustration of a typical drive according to this invention and marked for reference to the calculations in the specification.
Figure 4:
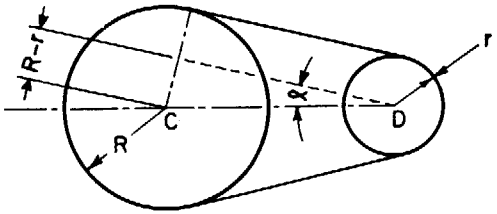

Note: See FIG. 4 for pictorial representation of drive to define radii, distances and angles.

sin $\alpha$=(R−r)/CD=1.114742/13.159=0.0847-13$\alpha$=4.8595°

Half lengths, straight strands=13.159 cos $\alpha$=13.1117 inches

On small pulley=85.1405(1.115121$\pi$)/180=1/6570 inches

Large pulley=94.8585(2.229863$\pi$)/180=3.6918 inches total=18.4605 inches

Belt length required=36.9210 inches $P_b$=36.9210/37=0.99786 inches

Try $P_b$=0.9970 inches $P_r$=0.99783 inches $P_R$=0.99776 inches r=b 1.111778 inches

R=2.223178

$\alpha$=4.8449°

Belt length required=36.8890 inches Actual belt length=(0.9970)(37 pitches)=36.8890 inches It must be remembered that the above belt pitch of 0.9970 inches is at no load. Applying the measuring load of 75 pounds/(inch)(strand) would increase the pitch by 0.00055 inches making p=0.99755 inches and the length (0.99755)(37 pitches)=36.909 inches.

1. Since the belt pitch under no load is shorter than pulley pitches by 0.00093 inches and 0.00076 inches in order to avoid interference when mounting the belts on the pulley it is necessary to provide pulley tooth gap clearance.

For the small pulley, four teeth (pitches) may engage the belt.

Clearance=(0.00093)(4)=0.0037 inches per tooth.

For the large pulley, 8 of its 14 teeth will engage the belt.

Clearance=0.00076(8)=0.0061 inches per tooth.

m. Now the complete specification can be written.

Belt Same section and tooth size as inches pitch.

Pitch=0.99755 inches width=0.600 inches

Length=37 pitches=36.909 inches at measuring load of 45 pounds per strand.

Installed tension=45 pounds per strand.

Figure 3:
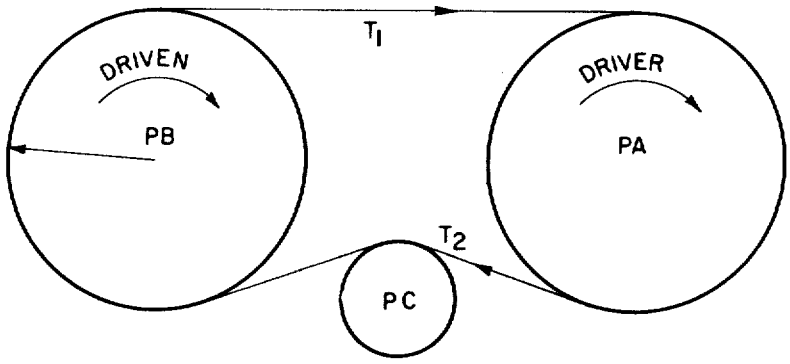
FIG. 3 illustrates schematically a drive according to this invention in which a belt tensioner is used.

Pulleys: Small: 7 teeth, pitch=0.99793 inches pitch dia=2,2236 inches tooth gap clearance=0.004 inches minimum Large: 14 teeth, pitch=0.99776 inches pitch dia=4.4463 inches tooth gap clearance=0.006 inches minimum Consider 2 pulleys, PA and PB, as illustrated in FIG. 3, connected by a flat belt. Pulley PC in the system is simply an idler, the function of which is to apply an initial or installed tension on the belt. When no turning moment is applied to the driveR pulley PA, the tensions in the two parts of the belt are alike (except possible for friction of the bearings) and is due to the installed tension applied by idler pulley PC.

It is evident that this initial will cause the belt to exert pressure on the faces of the pulleys, and this pressure will induce a frictional resistance opposing relative sliding between the belt and pulleys. If a turning moment is applied to PA and a resisting moment to PB, the frictional resistance will increase the tension in the upper strand and decrease the tension in the lower strand. Designate these tensions by $T_1$ and $T_2$ respectively. These correspond to the tensions $T_1$ and $T_2$ in the description of FIG. 1. It is evident that the tendency of the belt to slip around the pulleys owing to the difference in tension on the two parts of the belt is resisted by the frictional resistance between the belt and pulley faces. The difference in tensions tend to rotate pulley PB and when the turning movement $(T_1-T_2)$ $r_1$ becomes equal to the resisting moment applied to PB, rotation will take place, $r_1$ being the radius of the driveN pulley.

If the difference between $T_1$ and $T_2$, which is necessary to overcome the resisting moment is small compared to the frictional resistance between the belt and pulleys, no slipping of the belt on the pulleys will occur.

In addition to the slipping action described above, all belts are subject to what is known as "creep". Consider a piece of belt of unit length moving onto the pulley PA under tension $T_1$. As this piece of belt of unit length moves around the pulley, the tension to which it is subjected decreased from $T_1$ to $T_2$, and owing to its elasticity, the piece shrinks in length accordingly. The pulley PA, therefore, continually receives a greater length of belt than it delivers, and the velocity of the pulley surface is faster than that of the belt moving over it. Similarly, pulley PB receives a lesser length of belt than it delivers, and its surface velocity is slower than that of the belt moving over it. This creeping of the belt as it moves over the pulleys results in some unavoidable loss of power. The total loss of speed due to both slip and creep should not exceed 3 percent; that is, the surface speed of the driveR pulley should not exceed that of the driveN pulley by more than 3 percent. When it approaches 20 percent, there is danger of the belt sliding off the pulley entirely.

When slipping is impending, the equation relating belt tensions $T_1$ and $T_2$ to the coefficient of friction, $\mu$, and the angle of belt wrap, $\theta$, in radians, is $$T_1 = T_2 e^{\mu\theta}$$

where e is the base of natural logarithms, 2.718. This neglects the effect of centrifugal action, which is really not significant at belt velocities below 2,000 feet per minute.

If $T_1/T_2$ is less than or equal to $e^{\mu\theta}$, the belt will not slip on the pulleys; for ratios larger than this, slipping will occur. In all cases, however, the belt will creep on the pulleys. As the value of $T_1$ approaches that of $T_2$, $(T_1/T_2 \rightarrow 1)$, the amount of creep will diminish because there is less change in the length of a unit piece of belt moving over the pulley. When $T_1 = T_2$, we have the condition "as installed" and no power can be transmitted.

By designing the drive so that $T_1/T_2 = e^{\mu\theta}$, it is possible to get equal surface velocities at both pulleys if the radius of the driveR pulley is increased and radius of the driveN pulley is decreased to compensate for the change in belt length in its passage around the pulleys. Assuming the belt is to be perfectly elastic, the elongation $\epsilon$ in inches per inch can be expressed as:

$$\epsilon = K(T - T_2)$$

and since $T = T_2 e^{\mu\theta}$ $$\epsilon = KT_2(e^{\mu\theta} - 1)$$

and the change in the belt length $(l_1 - l_2)$ wrapping $\theta$ radians on a pulley of radius r is $l_1 - l_2 = KT_2 r (\mu^{l} e^{\mu\theta} - \theta - -_{\mu}{}^{1})$ All of of the above concerns flat belts running over pulleys having flat faces which are obviously capable of accommodating the belt properly regardless of the fact that pieces of belt having unit length vary with the change in belt tension therearound.

Now consider a synchronous belt drive in which the belt is provided with teeth to engage tooth gaps in the pulleys. The "unit length" referred to flat belts now becomes "pitch", p, for a toothed belt. Since the belt is elastic, in order to determine pitch it is necessary to measure the length of the belt subjected to a specified load called the "measuring load" and divide this by the number of teeth in the belt. It is apparent that the pitch or spacing between teeth will be greater or smaller depending on whether the belt tension is larger or smaller than the measuring load. Usually the measuring load is less than the installed belt tension.

If the pulleys are designed to match the pitch of the belt at the measuring load, they cannot accommodate the belt without interference between the belt teeth and pulley tooth gaps when the drive is running since the belt pitch changes continuously around the pulley. Furthermore, if the installed tension differs from the measuring load, there is a belt pulley pitch mismatch when the drive is at rest.

It is apparent that the above conventional design must subject the belt to abrupt changes of pitch whenever the belt engages or disengages the sprockets. This is accommodated only by the elastic deformation of the relatively soft teeth on the belt during the interference with the relatively rigid pulley teeth.

The invention herein involves at least two, and preferably three, changes from the above practice. The first is to make the pulley pitches match the pitch of the belt engaging or entering the pulley. From the maximum torque to be transmitted, the required driving force, F can be calculated. When the belt transmits power, the tension is increased on the tight side and decreased on the slack side until the difference in tension, $T_1 - T_2$, is equal to the required driving force, F. This is accomplished by what virtually amounts to shortening the belt on the tight side, a given amount by transferring this amount to the slack side. If the relation between elongation and tension is linear over the range $T_2$ to $T_1$, then the increase in tension on the tight side will equal the decrease in tension on the slack side; in which case, $T_1 = T_i + F/2$, and $T_2 = T_i - F/2$, where $T_i$ is the installed tension. When the relation is non-linear, it is only necessary to choose $T_1$ and $T_2$ from the graph, FIG. 2 such that $T_1 - T_2 = F$ and the elongation between $T_1$ and $T_i$ is equal to the elongation between $T_i$ and $T_2$. The pitch of the belt engaging each pulley can now be calculated. This determines the pitch of the pulleys, permitting the belt teeth to engage the pulley tooth gaps without interference because the belt and pulley pitches are alike on engagement.

The second change provides clearance in the pulley tooth gaps which accomplishes two purposes: (1) it permits the belt to wrap the pulley without interference between the belt teeth and the pulley tooth gaps when the belt is mounted on the pulleys and when the installed tension is applied by adjustment of the idler; and, more importantly, (2) it gives the belt freedom to change length (pitch) as the belt tension changes in traversing around the pulley, thereby taking advantage of friction, discussed earlier, as the principal means of carrying the belt load and avoiding slip. This frictional assistance significantly reduces the load imposed on the belt teeth, the primary function of which becomes one of maintaining synchronization during load pulsations, speed fluctuations, etc. This feature, in essence, makes the toothed pulleys into essentially flat pulleys. The pitch of the driveR pulley is larger than that of the driveN pulley; a requirement which is necessary to compensate for creep and make the surface velocities of both pulleys alike.

Finally, because of the reduced belt tooth loads resulting from the above two design improvements, it is apparent that fewer teeth can provide the synchronization, resulting in what might be called [and] *an* "extended pitch" belt, wherein the belt tooth size would be that of a standard smaller pitch belt, but the spacing between the teeth extended to something considerably larger, and not an integral number of the pitch defining the belt tooth size as is illustrated in FIG. 1. The procedure to follow is (a) assign an approximate diameter for the smallest pulley and arbitrarily fix the number of teeth in each pulley to meet the specified speed ratio; (b) calculate the approximate belt pitch required to meet the center distance specification; (c) reduce these approximations to precise dimensions by trial and error.

The elastic elongation- load characteristics of the belt must be known, and the minimum installed tension selected such that the ratio of belt tensions, $T_1/T_2$, at maximum drive load equals or exceeds $e^{\mu\theta}$ where e is the base for natural logarighms, 2.718, $\mu$ is the coefficient of friction between the belt and pulley face, and $\theta$ is the angle of wrap on the pulley. The choice of this initial tension will not permit the belt to slip, so that friction alone should be able to carry the load.

I claim:

[1. A synchronous belt and pulley drive comprising:

a driveR pulley;

a driveN pulley;

said pulleys being spaced from each other and each having a plurality of spaced tooth-gaps;

a belt engaging the pulleys and having spaced teeth which are accommodated by the tooth gaps of said pulleys;

the drive between said driveR pulley and said driveN pulley being substantially by friction of the belt thereon, the relationship of belt teeth and the pulley tooth gaps insuring synchronization of the drive between the pulleys and substantially eliminating slippage of the belt on the pulleys;

the pitch of the driveR pulley substantially matching the pitch of the belt under a first tension; and the pitch of the driveN pulley substantially matching the pitch of the belt under a second and different tension.]

[2. A drive as in claim 1 wherein said first tension is greater than second tension.]

[3. A drive as in claim 1 wherein said first tension is that of said belt from the driven pulley to the driveR pulley and said second tension is that of said belt from the driveR pulley to the driveN pulley.]

[4. A drive as in claim 1 wherein the spacing of the teeth on said belt is substantially extended to provide extensive frictional contact of the belt with the outer peripheries of said pulleys.]

[5. A synchronous belt and pulley drive comprising:

a driveR pulley and a driveN pulley which are spaced from each other;

spaced tooth gaps located around the periphery of each pulley; the spacing of which is different on one pulley than the other pulley;

a toothed belt wrapped between the pulleys, the teeth of which are accommodated within the pulley tooth gaps;

said belt having a taut strand and a slack strand when said drive is transmitting power from the driveR pulley to the driveN pulley; and the spacing of the tooth gaps of said driveR pulley being substantially equal to the spacing of the belt teeth on the taut strand thereof and the spacing of the tooth gaps of said driveN pulley being substantially equal to the spacing of the belt teeth on the slack strand thereof.]

[6. A drive as in claim 5 wherein the spacing of the tooth gaps on the driveN pulley is less than the spacing of the tooth gaps on the driveR pulley.]

[7. A synchronous belt and pulley drive comprising:

at least a driveR pulley and a driveN pulley which are spaced from each other, each pulley having equally spaced tooth gaps located in the periphery thereof, the spacing of which are different on each pulley;

a toothed belt wrapped between the pulleys, the teeth of which are accommodated within said pulley tooth gaps;

said belt having a taut strand and a slack strand when transmitting power from the driveR pulley to a driveN pulley;

said tooth gaps being of larger dimension than said teeth to permit the belt to wrap said pulleys without substantial tooth gap-belt teeth interference under belt tension;

the spacing of the tooth gaps of said driveR pulley being substantially equal to the pitch of the belt teeth on the taut strand thereof and the spacing of the tooth gaps of a driveN pulley being substantially equal to the pitch of the belt teeth on a slack side thereof.]

[8. A drive as in claim 7 wherein the spacing of the tooth gaps on a driveN pulley is less than the spacing of the tooth gaps on the driveR pulley.]

[9. A synchronous belt and pulley drive comprising:

a plurality of spaced pulleys each having a plurality of spaced tooth gaps in the periphery thereof;

a drive belt engaging the peripheries of the pulley and having spaced teeth which are accommodated by the tooth gaps of the pulleys, said belt having taut portions and slack portions when providing the drive for said pulleys such that the pitch of the belt in the taut and slack portions is different;

the pitch of said pulley tooth gaps being equal to the pitch of the belt at the entry of said belt to the pulley.]

[10. A synchronous belt and pulley drive as recited in claim 9 in which the pitch of the tooth gaps of one pulley is different from that of the next succeeding pulley.]

[11. A synchronous belt and pulley drive as in claim 9 in which there are two pulleys.]

*12. A synchronous belt and pulley drive comprising:*

*a driver toothed pulley and a driven toothed pulley, said pulleys being spaced from each other, and having spaced tooth gaps therein;*

*a toothed belt running over and engaging said pulleys and being constructed of elastomeric material at least on a surface thereof, said belt having a taut strand and a slack strand with its teeth equally spaced with the spacing defined by the tension applied thereto, the spacing of said teeth being greater than the width of said teeth to provide extensive frictional contact with the outer peripheries of said pulleys;*

*the spacing of the tooth gaps of said driveR pulley being equal to the spacing of the belt teeth corresponding to the design tension in the taut strand of said belt and the spacing of the tooth gaps of said driven pulley being equal to the spacing of the belt teeth corresponding to the lesser tension in the slack strand of said belt; said pulley tooth gaps being of larger size than said belt teeth in order to permit the belt to wrap said pulleys without interference on the bottom and sides of the tooth gaps.*

*13. A synchronous belt and pulley drive comprising:*

*a driver pulley and a driven pulley;*

*said pulleys being spaced from one another and each having bearing surfaces separated circumferentially by a plurality of uniformly spaced recesses for accommodating belt teeth, an endless belt engaging the pulleys and having on its inner surface a plurality of spaced teeth, the spacing between adjacent teeth being*

*uniform in the circumferential direction when the belt is free of tension,*

*the drive between said respective pulleys being primarily by friction between the belt and said bearing surfaces, the relationship of belt teeth and pulley recesses insuring synchronization of the drive,*

*said pulley recesses being circumferentially wider and radially deeper than said belt teeth,*

*the circumferential extent of the bearing surfaces being substantially greater than the circumferential width of the recesses,*

*the circumferential extent of the bearing surfaces on the driver pulley being matched to the spacing between adjacent belt teeth when the belt is stretched under a first tension, and*

*the circumferential extent of the bearing surfaces on the driven pulley being matched to the spacing between adjacent belt teeth when the belt is under a second and different tension.*

* * * * *